(12) United States Patent
Um et al.

(10) Patent No.: US 12,531,111 B2
(45) Date of Patent: Jan. 20, 2026

(54) SEMICONDUCTOR PACKAGE INCLUDING MEMORY DIE STACK HAVING CLOCK SIGNAL SHARED BY LOWER AND UPPER BYTES

(71) Applicant: Samsung Electronics Co., Ltd., Suwon-si (KR)

(72) Inventors: Youngdo Um, Suwon-si (KR); Taeyoung Oh, Suwon-si (KR); Hoseok Seol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 18/348,591

(22) Filed: Jul. 7, 2023

(65) Prior Publication Data

US 2024/0038295 A1 Feb. 1, 2024

(30) Foreign Application Priority Data

Aug. 1, 2022 (KR) .................. 10-2022-0095695
Mar. 2, 2023 (KR) .................. 10-2023-0027928

(51) Int. Cl.
*G11C 11/4076* (2006.01)
*G11C 11/4096* (2006.01)
(Continued)

(52) U.S. Cl.
CPC ...... *G11C 11/4096* (2013.01); *G11C 11/4076* (2013.01); *H01L 24/06* (2013.01);
(Continued)

(58) Field of Classification Search
CPC ..... H10B 80/00; G11C 11/4076; H01L 24/06; H01L 24/48; H01L 24/49; H01L 25/0657;
(Continued)

(56) References Cited

U.S. PATENT DOCUMENTS 7,352,602 B2 4/2008 Janzen
7,796,446 B2 9/2010 Ruckerbauer et al.
(Continued)

FOREIGN PATENT DOCUMENTS

JP 5647014 B2 11/2014
KR 20080092395 A 10/2008

OTHER PUBLICATIONS

"Low Power Double Data Rate 5 (LPDDR5)" JEDEC Standard No. 209-5B Section 16.1.1 (p. 573) (Jun. 2021).

*Primary Examiner* — Min Huang
(74) *Attorney, Agent, or Firm* — Wolf, Greenfield & Sacks, P.C.

(57) ABSTRACT

A semiconductor package includes a memory die stack having a clock signal shared by lower and upper bytes. Each of a plurality of memory dies constituting the memory die stack of the semiconductor package includes a first clock circuit configured to generate a read clock signal for a lower byte and an upper byte constituting a data width of the memory die, and a plurality of first die bond pads corresponding to the number of ranks of a memory system including the memory die, and each of the plurality of first die bond pads is set for each rank. The first clock circuit is connected to, among the plurality of first die bond pads, a die bond pad corresponding to a rank to which the memory die belongs.

19 Claims, 15 Drawing Sheets

(51) Int. Cl.
*H01L 23/00* (2006.01)
*H01L 25/065* (2023.01)
*H10B 80/00* (2023.01)

(52) U.S. Cl.
CPC .............. *H01L 24/48* (2013.01); *H01L 24/49* (2013.01); *H01L 25/0657* (2013.01); *H10B 80/00* (2023.02); *H01L 2224/06135* (2013.01); *H01L 2224/48091* (2013.01); *H01L 2224/48105* (2013.01); *H01L 2224/48111* (2013.01); *H01L 2224/48145* (2013.01); *H01L 2224/48227* (2013.01); *H01L 2224/4903* (2013.01); *H01L 2224/49109* (2013.01); *H01L 2224/49112* (2013.01); *H01L 2924/14361* (2013.01)

(58) Field of Classification Search
CPC . H01L 2224/03135; H01L 2224/48091; H01L 2224/48105; H01L 2224/48111; H01L 2224/48145; H01L 2224/48227; H01L 2224/4903; H01L 2224/49109; H01L 2224/49112; H01L 2924/14361
See application file for complete search history.

(56) References Cited

U.S. PATENT DOCUMENTS

| | | | |
|---|---|---|---|
| 8,681,525 | B2 | 3/2014 | Sato |
| 8,874,979 | B2 | 10/2014 | Cordero et al. |
| 8,966,208 | B2 | 2/2015 | Gillingham |
| 10,482,947 | B2 | 11/2019 | Cox et al. |
| 10,621,121 | B2 | 4/2020 | Lovelace et al. |
| 10,969,998 | B2 | 4/2021 | Lim |
| 2014/0054760 | A1* | 2/2014 | Yu ........................ H01L 23/3135 257/692 |
| 2019/0088651 | A1* | 3/2019 | Williams ................ G11C 5/063 |
| 2019/0157108 | A1* | 5/2019 | Liao ......................... H10D 1/68 |
| 2019/0371378 | A1* | 12/2019 | Kim ........................ G11C 7/109 |
| 2020/0098728 | A1* | 3/2020 | Xing ........................ H01L 24/49 |
| 2020/0150900 | A1* | 5/2020 | Bae ......................... G06F 3/0659 |
| 2023/0236653 | A1* | 7/2023 | Kang .................... G06F 3/0658 713/320 |
| 2024/0030190 | A1* | 1/2024 | Shi ....................... H01L 25/0657 |

* cited by examiner

SEMICONDUCTOR PACKAGE INCLUDING MEMORY DIE STACK HAVING CLOCK SIGNAL SHARED BY LOWER AND UPPER BYTES

CROSS-REFERENCE TO RELATED APPLICATIONS

This application is based on and claims priority under 35 U.S.C. § 119 to Korean Patent Application Nos. 10-2022-0095695, filed on Aug. 1, 2022, and 10-2023-0027928, filed on Mar. 2, 2023, in the Korean Intellectual Property Office, the disclosures of which are incorporated by reference herein in their entirety.

BACKGROUND

The inventive concept relates to a semiconductor device, and more particularly, to a semiconductor package in which memory chips having a clock signal shared by lower and upper bytes are stacked.

Electronic devices are becoming increasingly complex in their hardware configuration as they include a plurality of semiconductor integrated circuits (or semiconductor chips). Electronic devices use dynamic random-access memory (DRAM) as an operation memory or a main memory and use a storage device as a storage medium, so as to store data or instructions, used by a host, and/or to perform a computational operation. The storage device includes a plurality of non-volatile memories (NVMs).

Reducing the power consumption of electronic devices may be important. Memory system power may be an important factor in the power budget of electronic devices and accounts for a significant portion of the total system power. A memory system includes a memory having DRAM implemented on a plurality of separate DRAM chips. Some electronic devices may include a plurality of DRAM chips and a memory controller. The memory controller may divide separate DRAM chips among the plurality of DRAM chips into logical and/or physical groups for issues such as power control, addressing/memory access, and the like. For example, a plurality of DRAM chips may be included in one of a plurality of ranks, and may be divided into a target rank and a non-target rank. The target rank may include a DRAM chip that performs memory access according to a memory request, and the non-target rank may include a DRAM chip that does not perform memory access.

Low power double data rate synchronous DRAM (LPDDR SDRAM) is used in mobile electronic devices such as smartphones, tablet personal computers (PCs), and ultrabooks. As the capacity of a mobile operating system (OS) increases to support multi-tasking operations performed in mobile electronic devices, there is a need for mobile electronic devices having low power consumption characteristics and simultaneously having high-speed operation performance and high capacity. Accordingly, to provide highly integrated and high-capacity LPDDR SDRAM, a multi-chip package (MCP) may be used to stack a plurality of memory dies in one package.

In an MCP including a stack of a plurality of memory dies, the memory dies are conventionally connected to each other by a wire bond scheme and connected to a package substrate, to implement an electrical connection structure.

SUMMARY

The inventive concept, as manifested in one or more embodiments thereof, provides a semiconductor package including a memory die stack having a clock signal shared by lower and upper bytes.

According to an aspect of the inventive concept, a memory die includes: a first clock circuit configured to generate a read clock signal for a lower byte and an upper byte constituting a data width of the memory die; and a plurality of first die bond pads corresponding to the number of ranks of a memory system including the memory die, wherein each of the plurality of first die bond pads is configured to be connected to a rank to which the memory die belongs, wherein the first clock circuit is connected to a die bond pad of the corresponding rank among the plurality of first die bond pads.

According to another aspect of the inventive concept, a semiconductor package includes: a package substrate; a memory die stack mounted on the package substrate and including a stack of a plurality of memory dies, wherein the plurality of memory dies includes memory dies of a first rank and memory dies of a second rank; first wire bonds connecting the memory dies of the first rank; and second wire bonds connecting the memory dies of the second rank. Each of the plurality of memory dies includes: a first clock circuit configured to generate a read clock signal for a lower byte and an upper byte constituting a data width; a first die bond pad configured to transfer a read clock signal of the first rank; and a second die bond pad configured to transfer a read clock signal of the second rank, wherein the first clock circuit is connected to, among the first and second die bond pads, a die bond pad configured to transfer the read clock signal of a rank to which a corresponding memory die belongs.

According to another aspect of the inventive concept, a semiconductor package includes: a package substrate; and a memory die stack mounted on the package substrate and including a stack of a plurality of memory dies, wherein the plurality of memory dies includes a plurality of ranks, each of the plurality of memory dies includes: a clock circuit configured to generate a read clock signal for a lower byte and an upper byte constituting a data width; and a plurality of first die bond pads corresponding to the number of ranks, each of the plurality of first die bond pads is configured to be connected to a rank to which a corresponding memory die belongs, wherein the clock circuit is connected to a die bond pad of the corresponding rank among the plurality of first die bond pads.

BRIEF DESCRIPTION OF THE DRAWINGS

Embodiments will be more clearly understood from the following detailed description taken in conjunction with the accompanying drawings, wherein like reference numerals (when used) indicate corresponding elements throughout the several views, and in which.

DETAILED DESCRIPTION OF THE EMBODIMENTS

The inventive concept, as manifested in one or more embodiments thereof, provides a semiconductor package including a memory die stack having a clock signal shared by lower and upper bytes. Aspects of the present disclosure recognize that if a wire bond connection of a memory die stack is optimized while the functionality of a clock signal shared by lower and upper bytes as specified in LPDDR SDRAM is maintained, it would be beneficial for improving signal characteristics and/or performance of MCP semiconductor devices.

Figure 1:
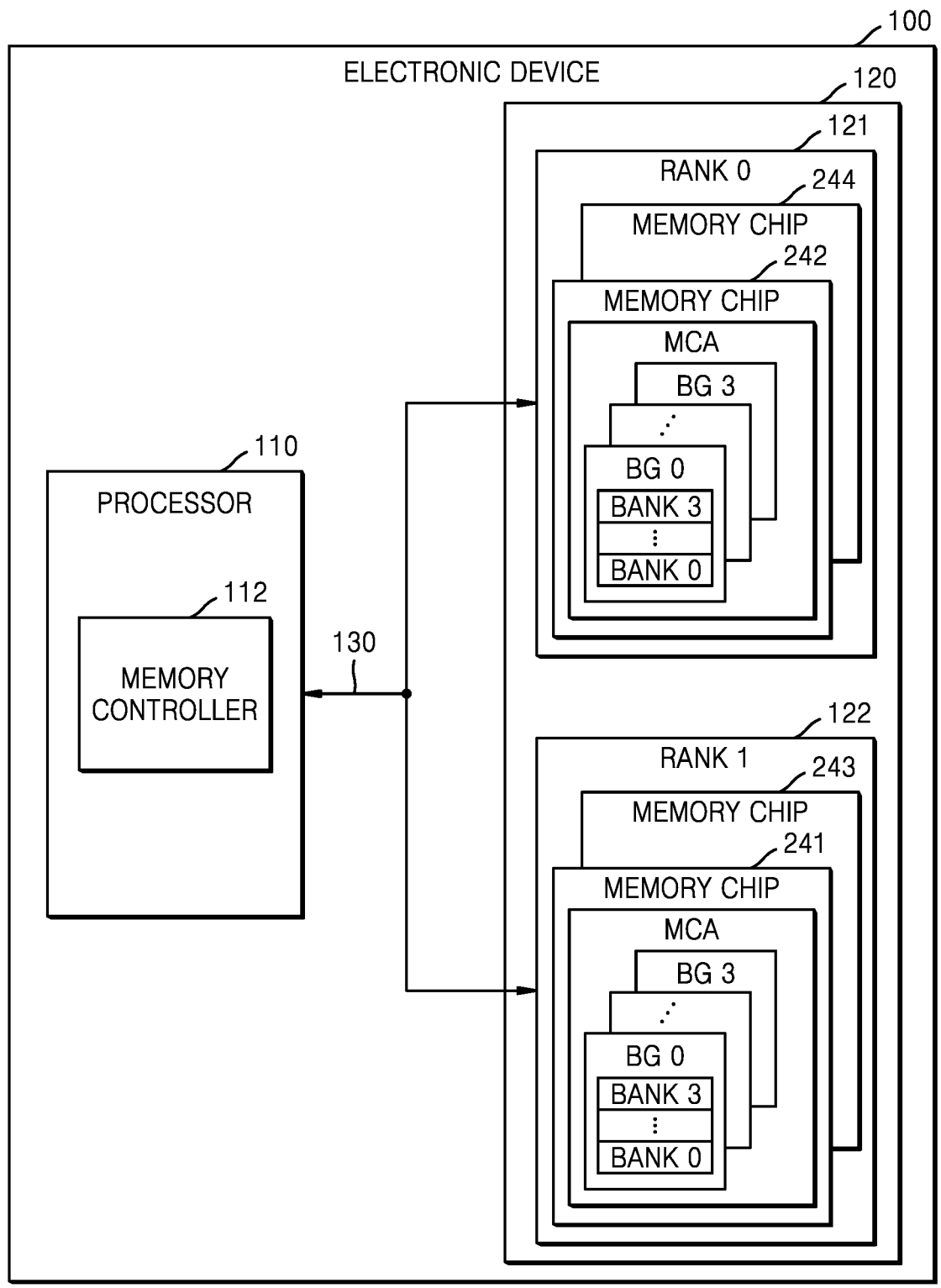
FIG. 1 is a block diagram depicting at least a portion of an example electronic device according to one or more embodiments.

FIG. 1 is a block diagram depicting at least a portion of an example electronic device 100 according to one or more embodiments.

Referring to FIG. 1, the electronic device 100 may include a processor 110 and a memory system 120. The electronic device 100 may be implemented to be included, for example, in a personal computer (PC) or a mobile electronic device. The mobile electronic device may be implemented, by way of example and without limitation, as a laptop computer, a mobile phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile Internet device (MID), a wearable computer, an Internet of Things (IoT) device, an Internet of Everything (IoE) device, and/or a drone.

The processor 110 may be configured to process and manage instructions as a primary component of the electronic device 100, and is primarily responsible for executing an operating system and applications. In addition, the processor 110 may be configured to enable a workload to be distributed across a plurality of computing entities to be processed in parallel so as to solve a complex operation or task, such as in a distributed computing environment. The processor 110 is a functional block configured to execute one or more machine-executable commands or pieces of software, firmware, or a combination thereof. The processor 110 may be implemented by using hardware, that is, various circuit elements and devices, that performs calculations and other operations (for example, a control operation or a configuration operation) in the electronic device 100.

The processor 110 may be implemented as an integrated circuit (IC), a system on chip (SoC), an application processor (AP), a mobile AP, a chipset, and/or a set of chips. As an example, the processor 110 may be a semiconductor device that performs a memory control function, and may include a memory controller 112. The processor 110 may further include random access memory (RAM), a central processing unit (CPU), a graphics processing unit (GPU), and/or a modem (not explicitly shown, but implied).

The memory system 120 may include a functional block that performs the operation of a memory (for example, "main memory") of the electronic device 100, and may be implemented as, for example, 6th generation LPDDR SDRAM (LPDDR6 SDRAM). LPDDR6 SDRAM may include a memory circuit, and may be configured to process access to data and instructions stored in the memory circuit, and to perform other control or configuration operations. LPDDR6 SDRAM is a "dynamic" memory circuit. The dynamic memory circuit stores information (for example, bits of information such as data, instructions, or the like) by using a circuit element, such as a capacitor or other storage element, that loses charge over time due to leakage and/or other charge loss mechanisms. A DRAM cell including one transistor and one storage capacitor exhibits variable data retention characteristics, and periodically performs a refresh operation to re-store data of the DRAM cell to prevent loss of stored information.

The memory system 120 may include a plurality of memory dies 241 to 244. For example, each of the plurality of memory dies 241 to 244 may include a memory cell array MCA, the memory cell array MCA may include a plurality of bank groups BG0 to BG3 each including a plurality of banks BANK0 to BANK3, and each of the banks BANK0 to BANK3 may include a plurality of memory cell rows (or pages). The configuration of the memory cell array MCA shown in FIG. 1 as an example does not represent or suggest limitations to the inventive concept. For example, the memory cell array MCA may include 4 bank groups according to a 16, 12, 8, 6, or 4 data (DQ) signal configuration implemented in a single channel 130, and may include 4 banks per bank group or may include 8 banks or 16 banks per bank group.

Each, or at least a subset, of the plurality of memory dies 241 to 244 may include, for example, LPDDR6 SDRAM, and may be logically and/or physically divided into at least two ranks. The term "rank" as used herein is intended to broadly refer to a set, grouping or other organization of memory dies in the memory system 120. Each rank may include one or more memory dies, and the number of memory dies associated with each rank may not necessarily be the same (although they may be the same). In the present example embodiment, the memory system 120 is illustrated as having a two-rank structure but is not limited thereto and may have various other rank structures. In the following embodiments, for convenience of explanation, the memory dies 242 and 244 may be referred to as a first rank 121, and the memory dies 241 and 243 may be referred to as a second rank 122. In addition, the first and second ranks 121 and 122 and the terms "RANK0" and "RANK1," respectively, may be used interchangeably.

The memory controller 112 of FIG. 1 may be a functional block that manages, controls, and otherwise processes an interaction between the processor 110 and the memory system 120. For example, the memory controller 112 may perform memory access (that is, read, write, or the like) instead of the processor 110, and may perform configuration and control operations and/or other operations on the memory system 120. The memory controller 112 may communicate with the memory system 120 via the channel 130. The channel 130 may be implemented as a bus including command/address signal lines that transmit a command/address (CMD/ADDR, hereinafter, referred to as "CA"), data lines that transmit data (DQ[12:0], hereinafter, referred to as "DQ"), and clock signal lines that transmit data clock signals (WCK and WCKB, hereinafter, referred to as "WCK") and read clock signals (RDQS and RDQSB, hereinafter, referred to as "RDQS").

The channel 130 may further include clock signal lines that transmit clock signals (CK and CKB) and chip select signal lines that transmit chip selection signals (CS0 and CS1) for distinguishing the first and second ranks 121 and 122, respectively. WCK and WCKB clock signals are complementary, RDQS and RDQSB clock signals are complementary, and CK and CKB clock signals are complementary. A clock signal may be defined as "complementary" when a rising edge of a first clock signal is synchronized with a falling edge of a second clock signal and when a rising edge of the second clock signal is synchronized with a falling edge of the first clock signal. The first and second ranks 121 and 122 may share the clock signal lines, the command/address signal lines, and the data lines of the channel 130.

Figure 2:
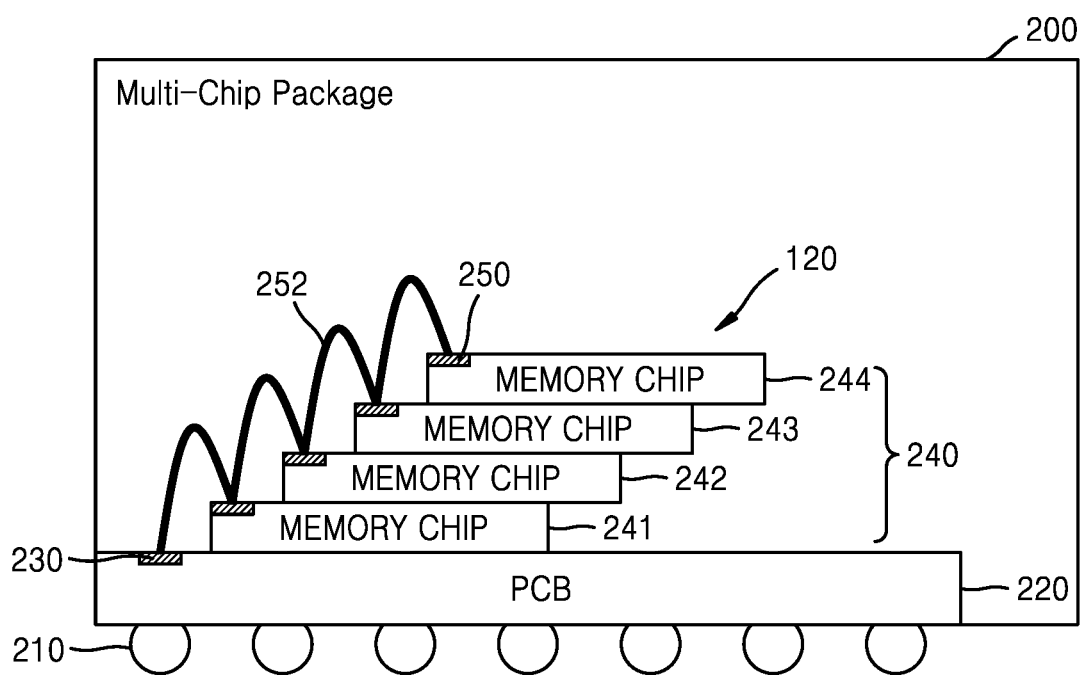
FIG. 2 is a cross-sectional view depicting at least a portion of an example semiconductor package according to one or more embodiments.

FIG. 2 is a cross-sectional view depicting at least a portion of an example semiconductor package according to one or more embodiments of the inventive concept. More particularly, FIG. 2 may be an edge view of a semiconductor package 200 implementing the memory system 120 of FIG. 1.

Referring to FIG. 2, the semiconductor package 200 shows a memory die stack 240 mounted on a package substrate 220 (e.g., a printed circuit board (PCB)). The memory die stack 240 includes a stack of the memory dies 241, 242, 243, and 244 in a continuous offset stepped configuration. In the following embodiments, for convenience of explanation, the semiconductor package 200 may be referred to as a multi-chip package. The term "semiconductor package" and the term "multi-chip package" or "MCP" may be used interchangeably.

The memory dies 241, 242, 243, and 244 may include die bond pads 250 aligned along respective edges of the memory dies 241, 242, 243, and 244. The die bond pads 250 of the memory dies 241, 242, 243, and 244 may be electrically connected to a contact pad 230 of the package substrate 220 via wire bonds 252. The number of die bond pads 250 and the number of wire bonds 252 are shown for simplicity, and it will be appreciated that more die bond pads 250 and wire bonds 252 than shown may be included. The wire bonds 252 may connect corresponding die bond pads 250 to establish interface connections between the memory dies 241, 242, 243, and 244. The term "pad" broadly refers to an electrical interconnection to an IC, and may include, for example, a pin or other electrical contact points on an IC.

The package substrate 220 may include a plurality of conductive layers separated by an insulating layer and through-silicon vias (TSVs) therein. The conductive layers and TSVs of the package substrate 220 may be connected to external terminals 210 (i.e., conductive structures) of the semiconductor package 200. For example, the external terminals 210 of the semiconductor package 200 may be implemented as package balls (e.g., solder balls, solder bumps, micro-bumps, etc.) or leads. The semiconductor package 200 may be implemented as a package, such as a package-on-package (PoP), a ball grid array (BGA), a chip scale package (CSP), a plastic leaded chip carrier (PLCC), a plastic dual in-line package (PDIP), a die in waffle pack, a die in wafer form, a chip on board (COB), a ceramic dual in-line package (CERDIP), a metric quad flat package (MQFP), a thin quad flatpack (TQFP), a small outline integrated circuit (SOIC), a shrink small outline package (SSOP), a thin small outline package (TSOP), a system in package (SIP), a multi-chip package (MCP), a wafer-level fabricated package (WFP), a wafer-level processed stack package (WSP).

Figure 3:
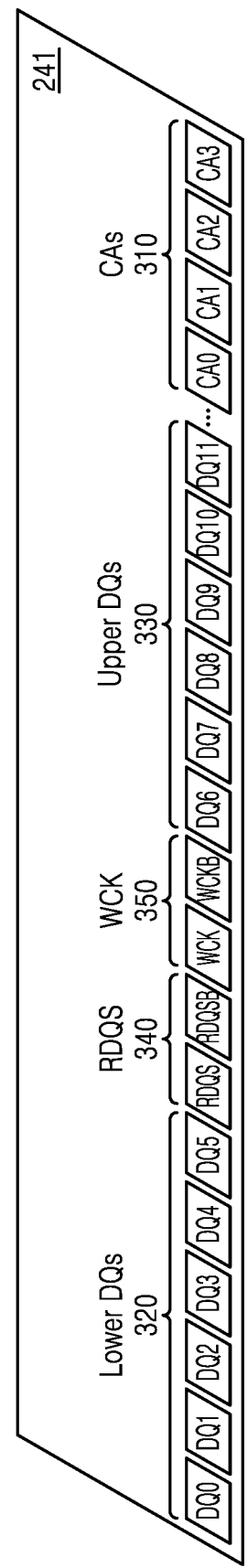
FIGS. 3 and 4 are diagrams for explaining a memory die and a semiconductor package, respectively, as comparative examples of the inventive concept.
Figure 4:
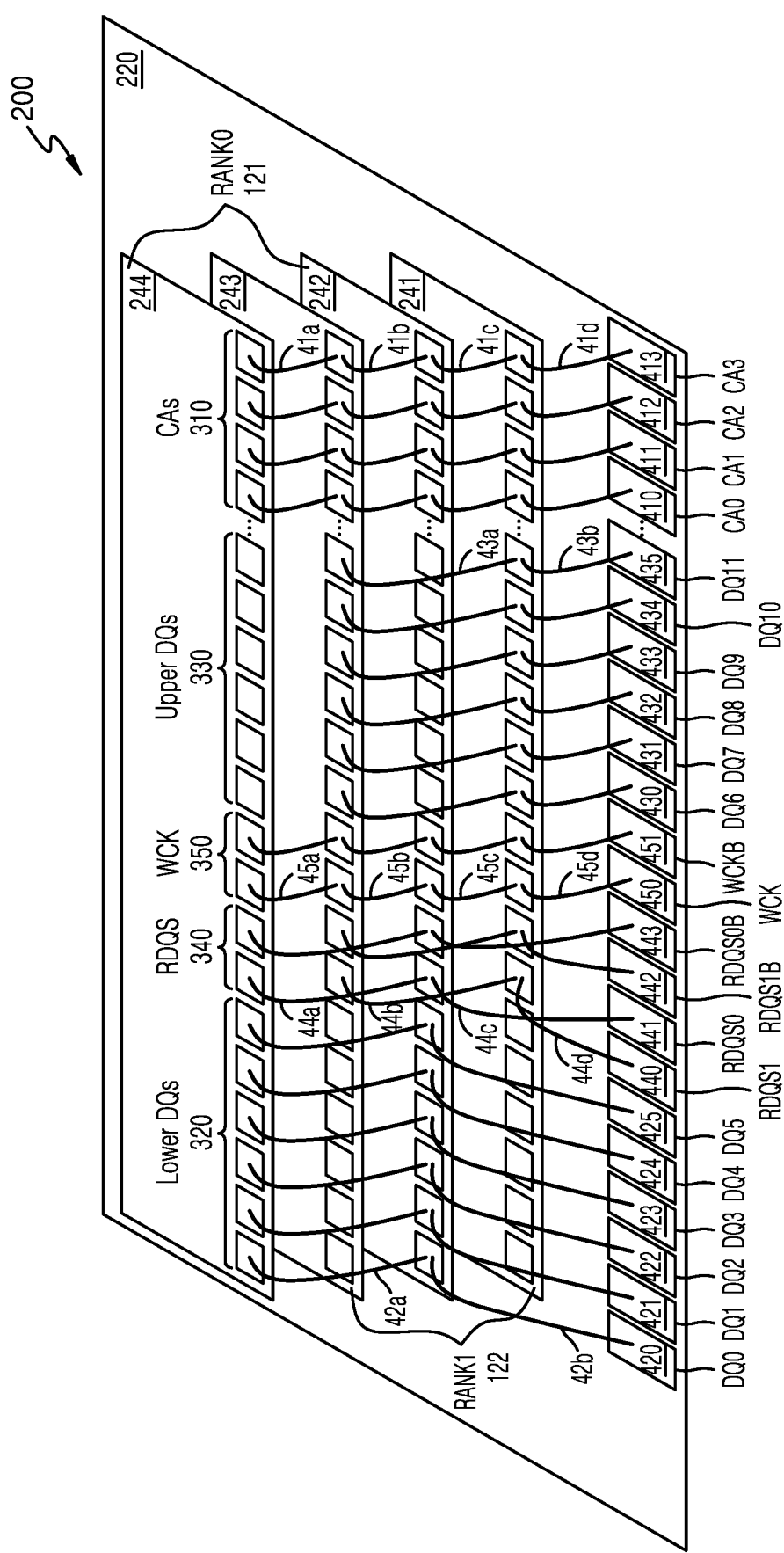

FIGS. 3 and 4 are diagrams for explaining a memory die and a semiconductor package, respectively, as comparative examples of the inventive concept. FIG. 3 illustrates a portion of one memory die (for example, 241) constituting the memory die stack 240, and the semiconductor package 200 of FIG. 4 shows wire bond connections between the memory die 241 and the memory dies 242, 243, and 244 that may be identical to the example configuration of the memory die 241 of FIG. 3.

Referring to FIG. 3, the memory die 241 may include a first set of die bond pads 310, and the first set of die bond pads 310 may include a plurality of CA pads CA0 to CA3. The plurality of CA pads CA0 to CA3 may receive a command or an address from the memory controller 112 (FIG. 1).

The memory die 241 may include a second set of die bond pads 320 and a third set of die bond pads 330. The second set of die bond pads 320 may include a plurality of lower DQ pads DQ0 to DQ5, and the third set of die bond pads 330 may include a plurality of upper DQ pads DQ6 to DQ11. The plurality of lower and upper DQ pads DQ0 to DQ5 and DQ6 to DQ11 may transmit data DQ read from the memory cell array MCA to the memory controller 112 or may receive write data DQ provided from the memory controller 112 (FIG. 1).

The memory die 241 may include a fourth set of die bond pads 340 and a fifth set of die bond pads 350, the fourth set of die bond pads 340 may include RDQS pads RDQS and RDQSB, and the fifth set of die bond pads 350 may include WCK pads WCK and WCKB. When the read data DQ is transmitted via the plurality of lower and upper DQ pads DQ0 to DQ5 and DQ6 to DQ11, the RDQS pads RDQS and RDQSB may transmit the RDQS and RDQSB clock signals, which provide timing of the read data DQ, to the memory controller 112 (FIG. 1). When the write data DQ is received via the plurality of lower and upper DQ pads DQ0 to DQ5 and DQ6 to DQ11, the WCK pads WCK and WCKB may receive the WCK and WCKB clock signals, which provide timing of the write data DQ, from the memory controller 112. In addition, the WCK pads WCK and WCKB may receive the WCK and WCKB clock signals provided from the memory controller 112 in a preparation operation for providing the read data DQ to the memory controller 112.

Referring to FIG. 4, each of the memory dies 241 to 244 stacked in the semiconductor package 200 may include the first to fifth sets of die bond pads 310, 320, 330, 340, and 350. The package substrate 220 may include a first set of contact pads 410 to 413, and the first set of contact pads 410 to 413 may transmit CA0 to CA3 signals, respectively, of the first rank 121 and the second rank 122. The first set of contact pads 410 to 413 may be connected to wire bonds 41a, 41b, 41c, and 41d connected to the memory dies 241 to 244 of the first rank 121 and the second rank 122, and may transmit the CA0 to CA3 signals to the first set of die bond pads 310 of the memory dies 241 to 244.

The package substrate 220 may include a second set of contact pads 420 to 425, and the second set of contact pads 420 to 425 may transmit lower group data (for example, DQ[5:0]) of the first rank 121. The second set of contact pads 420 to 425 may be connected to wire bonds 42a and 42b connected to the memory dies 242 and 244 of the first rank 121, and may transmit/receive DQ[5:0] data to/from the second set of die bond pads 320 of the corresponding memory dies 242 and 244.

The package substrate 220 may include a third set of contact pads 430 to 435, and the third set of contact pads 430 to 435 may transmit upper group data (for example, DQ[11:6]) of the second rank 122. The third set of contact pads 430 to 435 may be connected to wire bonds 43*a* and 43*b* connected to the memory dies 241 and 243 of the second rank 122, and may transmit/receive DQ[11:6] data to/from the third set of die bond pads 330 of the corresponding memory dies 241 and 243. Hereinafter, regarding the terms "lower byte" and "upper byte" specified in the LPDDR specification, lower group data (for example, DQ[5:0]) may be referred to as lower byte data, and upper group data (for example, DQ[11:6]) may be referred to as upper byte data.

The package substrate 220 may include a fifth set of contact pads 450 and 451, and the fifth set of contact pads 450 and 451 may transmit the WCK and WCKB clock signals of the first rank 121 and the second rank 122. The fifth set of contact pads 450 and 451 may be connected to wire bonds 45*a*, 45*b*, 45*c*, and 45*d* connected to the memory dies 241 to 244 of the first rank 121 and the second rank 122, and may transmit the WCK and WCKB clock signals to the fifth set of die bond pads 350 of the memory dies 241 to 244.

The package substrate 220 may include a fourth set of contact pads 440 to 443, the contact pads 441 and 443 may receive RDQS0 and RDQS0B clock signals, and the contact pads 440 and 442 may receive RDQS1 and RDQS1B clock signals of the second rank 122. The RDQS0 and RDQS0B clock signals may be used to provide timing of read data with respect to the first rank 121, and the RDQS1 and RDQS1B clock signals may be used to provide timing of read data with respect to the second rank 122.

The contact pad 441 may be connected to wire bonds 44*a* and 44*c* connected to the memory dies 242 and 244 of the first rank 121 and may receive the RDQS0 clock signal from the fourth set of die bond pads 340 of the memory dies 242 and 244, and the contact pad 440 may be connected to wire bonds 44*b* and 44*d* connected to the memory dies 241 and 243 of the second rank 122 and may receive the RDQS1 clock signal from the fourth set of die bond pads 340 of the memory dies 241 and 243. The contact pad 443 may be connected to the wire bonds 44*a* and 44*c* connected to the memory dies 242 and 244 of the first rank 121 and may receive the RDQS0B clock signal from the fourth set of die bond pads 340 of the memory dies 242 and 244, and the contact pad 442 may be connected to the wire bonds 44*b* and 44*d* connected to the memory dies 241 and 243 of the second rank 122 and may receive the RDQS1B clock signal from the fourth set of die bond pads 340 of the memory dies 241 and 243.

However, the wire bonds 44*c* and 44*d* to which the RDQS0 clock signal of the first rank 121 and the RDQS1 clock signal of the second rank 122 are transferred may be formed to overlap each other. As the wire bonds 44*c* and 44*d* overlap each other, the wire bonds 44*c* and 44*d* may be shorted. In addition, the wire bonds 44*c* and 44*d* to which the RDQS0B clock signal of the first rank 121 and the RDQS1B clock signal of the second rank 122 are transferred may also overlap each other and may thus be shorted. Even when a short circuit does not occur in an initial packaging operation of the semiconductor package 200, the quality of the package may change over time, and the operation of the semiconductor package 200 may fail due to a short circuit of the wire bonds 44*c* and 44*d*. Accordingly, when die bond pads to which the RDQS and RDQSB clock signals for each rank are connected are added to each memory die, and wire bonds are connected so that the RDQS and RDQSB clock signals of the corresponding rank are transmitted to the added die bond pads, signal characteristics and/or performance of the semiconductor package 200 may be improved.

Figure 5:
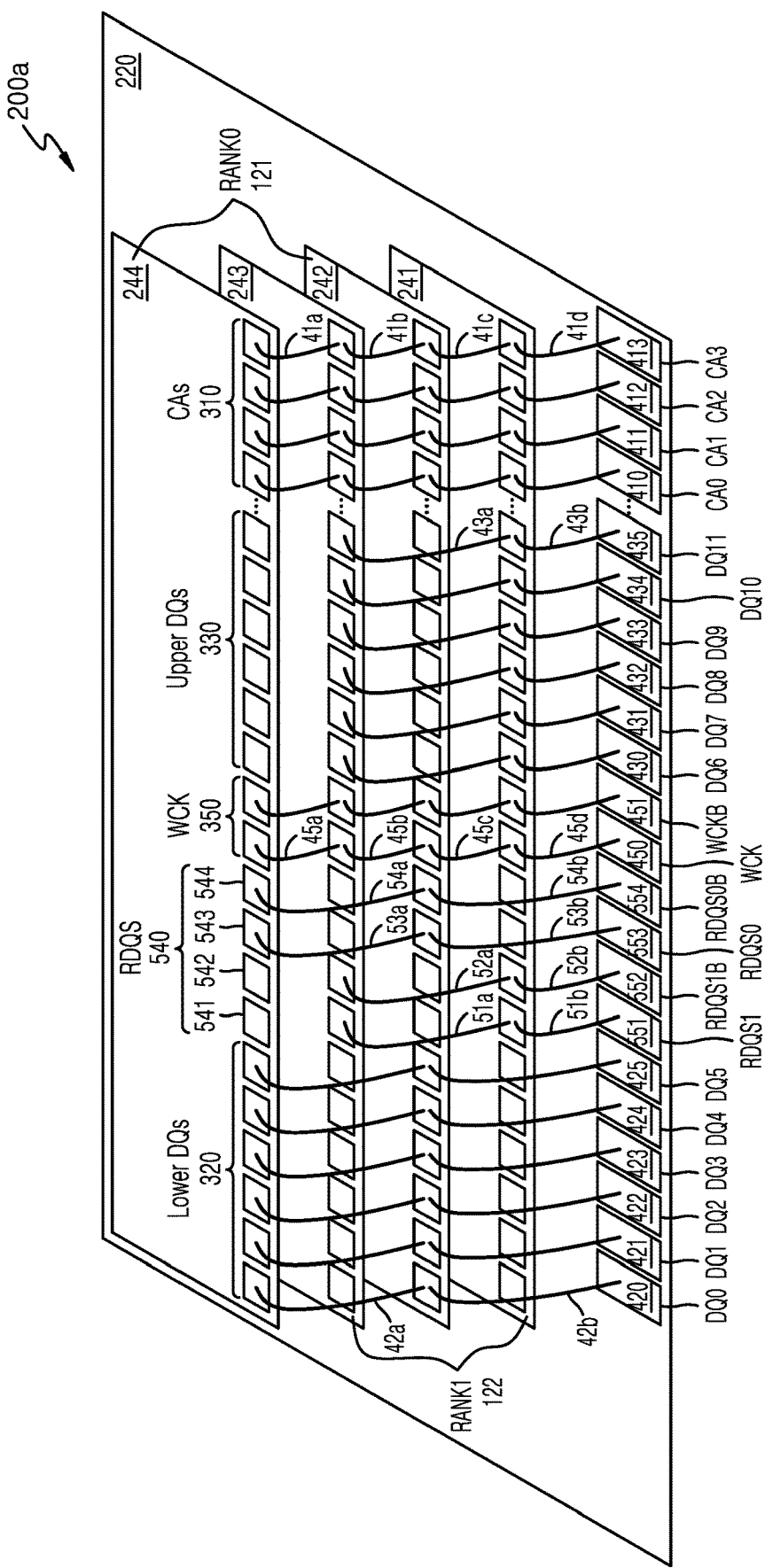
FIGS. 5 to 6B are diagrams conceptually depicting at least a portion of an example semiconductor package according to one or more embodiments.
Figure 6A:
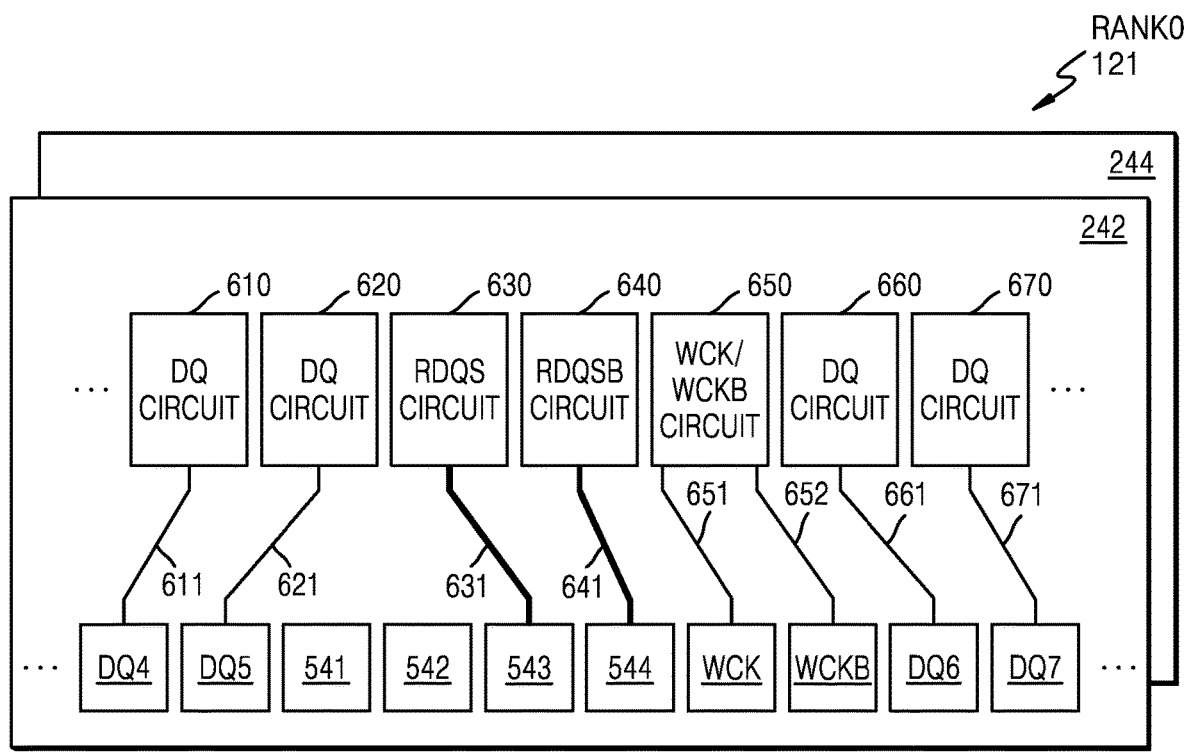
Figure 6B:
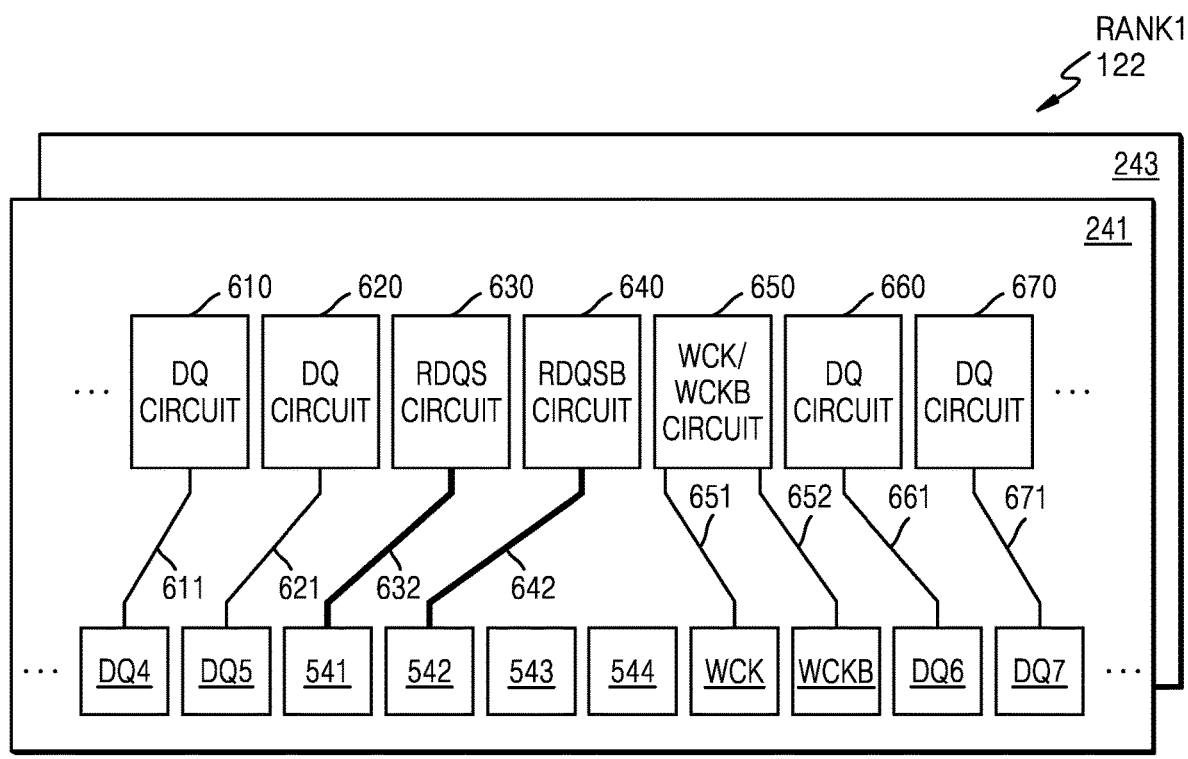

FIGS. 5 to 6B are diagrams conceptually depicting at least a portion of an example semiconductor package according to one or more embodiments. FIG. 6A describes the pad arrangement of the memory dies 242 and 244 included in the first rank 121 of a semiconductor package 200*a*, and FIG. 6B describes the pad arrangement of the memory dies 241 and 243 included in the second rank 122. Hereinafter, a suffix (for example, "a" in 200*a*) attached to the same reference numeral in different drawings is to distinguish between a plurality of circuits having similar or identical functions. The semiconductor package 200*a* of FIG. 5 differs from the semiconductor package 200 of FIG. 4 in that the former further includes die bond pads connected to the RDQS clock signal for each rank. Descriptions already given in connection with the semiconductor package 200 are omitted.

Referring to FIG. 5, the semiconductor package 200*a* may constitute a portion of the semiconductor package 200 described with reference to FIGS. 1 to 4. The semiconductor package 200*a* may include, on the package substrate 220, the memory dies 242 and 244 constituting the first rank 121, and the memory dies 241 and 243 constituting the second rank 122.

Each of the memory dies 241, 242, 243, and 244 may include the first set of die bond pads 310 including the plurality of CA pads CA0 to CA3, the second set of die bond pads 320 including the plurality of lower DQ pads DQ0 to DQ5, the third set of die bond pads 330 including the plurality of upper DQ pads DQ6 to DQ11, and the fifth set of die bond pads 350 including the WCK pads WCK and WCKB, described with reference to FIGS. 3 and 4. In addition, each of the memory dies 241, 242, 243, and 244 may include a fourth set of die bond pads 540 related to the RDQS pads RDQS and RDQSB. The fourth set of die bond pads 540 may include, for example, four die bond pads 541, 542, 543, and 544.

The four die bond pads 541, 542, 543, and 544 may be configured to have different wiring structures depending on whether a corresponding memory die is included in the first rank 121 or the second rank 122. Referring to FIGS. 6A and 6B, each of the memory dies 241, 242, 243, and 244 may include the memory cell array MCA and a peripheral circuit, and the peripheral circuit may include data input/output (DQ) circuits 610, 620, 660, and 670, first and second clock (RDQS, RDQSB) circuits 630 and 640, and a third clock (WCK/WCKB) circuit 650. Although not explicitly shown in FIGS. 6A and 6B, each of the memory dies 241, 242, 243, and 244 may further include a row decoder, a column decoder, a read/write circuit, or a control logic circuit. The configurations of the memory dies 241, 242, 243, and 244 shown in FIGS. 6A and 6B as examples do not represent or suggest limitations to the inventive concept.

Meanwhile, the memory controller 112 (FIG. 1) may provide a command to the first rank 121 or the second rank 122 to perform a memory operation. Non-limiting examples of a memory command may include an access command for accessing a memory, for example, a read command for performing a read operation and a write command for performing a write operation.

In operation, when a read command and a related address are provided to a selected rank among the first and second ranks 121 and 122 by the memory controller 112, the selected rank may receive the read command and the related address and perform a read operation to output the read data DQ from a memory location corresponding to the related address. The read data DQ may be provided to the memory controller 112 by a memory die of the selected rank according to timing related to the reception of the read command. For example, when the read data DQ is provided to the memory controller 112 by the memory die, the timing may be based on a read latency (RL) value that represents the number of clock cycles of a CK clock (referred to as tCK) after the read command.

In preparation for a corresponding rank to provide the read data DQ to the memory controller 112, the memory controller 112 may provide an active WCK clock signal to a memory die of the corresponding rank. The WCK clock signal may be used by a memory die to generate the RDQS clock signal. A clock signal is activated when the clock signal periodically transitions between a low clock level and a high clock level. On the contrary, a clock signal is deactivated when the clock signal maintains a constant clock level and does not transition periodically. The RDQS clock signal may be provided to the memory controller 112 by a memory die that has performed a read operation for timing of providing read data to the memory controller 112. The memory controller 112 may use the RDQS clock signal to receive the read data DQ.

In operation, when a write command and a related address are provided to a selected rank by the memory controller 112, a memory die of the selected rank may receive the write command and the related address and perform a write operation to write the write data DQ from the memory controller 112 to a memory location corresponding to the related address. The write data DQ may be provided to the memory system 120 by the memory controller 112 according to timing related to the reception of the write command. For example, when the write data DQ is provided to the memory system 120 by the memory controller 112, the timing may be based on a write latency (WL) value that represents the number of clock cycles of a CK clock (tCK) after the write command.

In preparation for a corresponding rank to receive the write data DQ from the memory controller 112, the memory controller 112 may provide an active WCK clock signal to a memory die of the corresponding rank. The WCK clock signal may be used by a memory die to generate an internal clock signal for operation timing of a circuit that receives the write data DQ. The write data DQ may be provided to the memory controller 112, the memory die may receive the write data DQ according to the WCK clock signal, and the write data DQ may be written to a memory location corresponding to a memory address.

The data input/output circuits 610, 620, 660, and 670 may be configured to transmit the read data DQ synchronized with the RDQS clock signal to the memory controller 112 and receive the write data DQ synchronized with the WCK clock signal from the memory controller 112. The data DQ transmitted/received by the data input/output circuits 610, 620, 660, and 670 may include a data width of 12 bits. The data width of 12 bits may be divided into a lower byte of 6-bit data and an upper byte of 6-bit data.

The first and second clock circuits 630 and 640 may be configured to generate the RDQS and RDQSB clock signals and provide timing for providing read data to the memory controller 112. The RDQS and RDQSB clock signals may be provided from the memory dies 241, 242, 243, and 244 that have performed a read operation to the memory controller 112 by the first and second clock circuits 630 and 640. The third clock circuit 650 may be configured to receive the WCK and WCKB clock signals and generate an internal clock signal for operation timing of a circuit that receives the write data DQ. The memory dies 241, 242, 243, and 244 that perform a write operation may receive the WCK and WCKB clock signals by the third clock circuit 650.

In FIG. 6A, the memory dies 242 and 244 constituting the first rank 121 may include some (for example, DQ4, DQ5, WCK, WCKB, DQ6, and DQ7 die bond pads) of the die bond pads described with reference to FIG. 3, and the four die bond pads 541, 542, 543, and 544. The DQ4, DQ5, DQ6, and DQ7 die bond pads may be respectively connected to the data input/output circuits 610, 620, 660, and 670 respectively via first metal wirings 611, 621, 661, and 671. The WCK and WCKB die bond pads may be connected to the third clock circuit 650 respectively via first metal wirings 651 and 652. Right two die bond pads 543 and 544 among the four die bond pads 541, 542, 543, and 544 may be respectively connected to the first and second clock circuits 630 and 640 respectively via second metal wirings 631 and 641. The RDQS clock signal generated by the first clock circuit 630 may be provided to the die bond pad 543, and the RDQSB clock signal generated by the second clock circuit 640 may be provided to the die bond pad 544.

In FIG. 6B, in the memory dies 241 and 243 constituting the second rank 122, as described with reference to FIG. 6A, the DQ4, DQ5, DQ6, and DQ7 die bond pads may be respectively connected to the data input/output circuits 610, 620, 660, and 670 respectively via the first metal wirings 611, 621, 661, and 671, and the WCK and WCKB die bond pads may be connected to the third clock circuit 650 respectively via the first metal wirings 651 and 652. Left two die bond pads 541 and 542 among the four die bond pads 541, 542, 543, and 544 may be respectively connected to the first and second clock circuits 630 and 640 respectively via second metal wirings 632 and 642. The RDQS clock signal generated by the first clock circuit 630 may be provided to the die bond pad 541, and the RDQSB clock signal generated by the second clock circuit 640 may be provided to the die bond pad 542.

In FIGS. 6A and 6B, the second metal wirings 631, 632, 641, and 642 (shown in bold) may be formed on a metal layer higher than a metal layer on which the first metal wirings 611, 621, 651, 652, 661, and 671 are formed. For example, the second metal wirings 631, 632, 641, and 642 may be formed by using an uppermost metal layer of the memory dies 241, 242, 243, and 244. According to an embodiment, each of the second metal wirings 631, 632, 641, and 642 may be formed by using a plurality of redistribution layers. The plurality of redistribution layers may extend to electrically connect an internal connection pad of the memory dies 241, 242, 243, and 244 to an external connection pad. As the RDQS and RDQSB clock signals for each rank are connected to the die bond pads 541, 542, 543, and 544 by using the plurality of redistribution layers, the configurations of the memory dies 241, 242, 243, and 244 may be facilitated without performing a separate process.

Referring back to FIG. 5, the memory dies 241, 242, 243, and 244 described with reference to FIGS. 6A and 6B may be stacked in the continuous offset stepped configuration described with reference to FIG. 2 to constitute the memory die stack 240. The package substrate 220 may include a fourth set of contact pads 551 to 554, the contact pads 553 and 554 may receive the RDQS0 and RDQS0B clock signals, respectively, of the first rank 121, and the contact pads 551 and 552 may receive the RDQS1 and RDQS1B clock signals, respectively, of the second rank 122.

The contact pad 553 may be connected to wire bonds 53a and 53b connected to the memory dies 242 and 244 of the first rank 121 and may be connected to the die bond pad 543 of the memory dies 242 and 244, to receive the RDQS0 clock signal provided by the first clock circuit 630. The contact pad 554 may be connected to wire bonds 54*a* and 54*b* connected to the memory dies 242 and 244 of the first rank 121 and may be connected to the die bond pad 544 of the memory dies 242 and 244, to receive the RDQS0B clock signal provided by the second clock circuit 640.

The contact pad 551 may be connected to wire bonds 51*a* and 51*b* connected to the memory dies 241 and 243 of the second rank 122 and may be connected to the die bond pad 541 of the memory dies 241 and 243, to receive the RDQS1 clock signal provided by the first clock circuit 630. The contact pad 552 may be connected to wire bonds 52*a* and 52*b* connected to the memory dies 241 and 243 of the second rank 122 and may be connected to the die bond pad 542 of the memory dies 241 and 243, to receive the RDQS1B clock signal provided by the second clock circuit 640.

As shown in FIG. 5, the wire bonds 51*a*, 51*b*, 52*a*, 52*b*, 53*a*, 53*b*, 54*a*, and 54*b* that transmit the RDQS0 and RDQS0B clock signals of the first rank 121 and the RDQS1 and RDQS1B clock signals of the second rank 122 may be formed without overlapping. Accordingly, signal characteristics and/or performance of the semiconductor package 200*a* may be improved.

Figure 7:
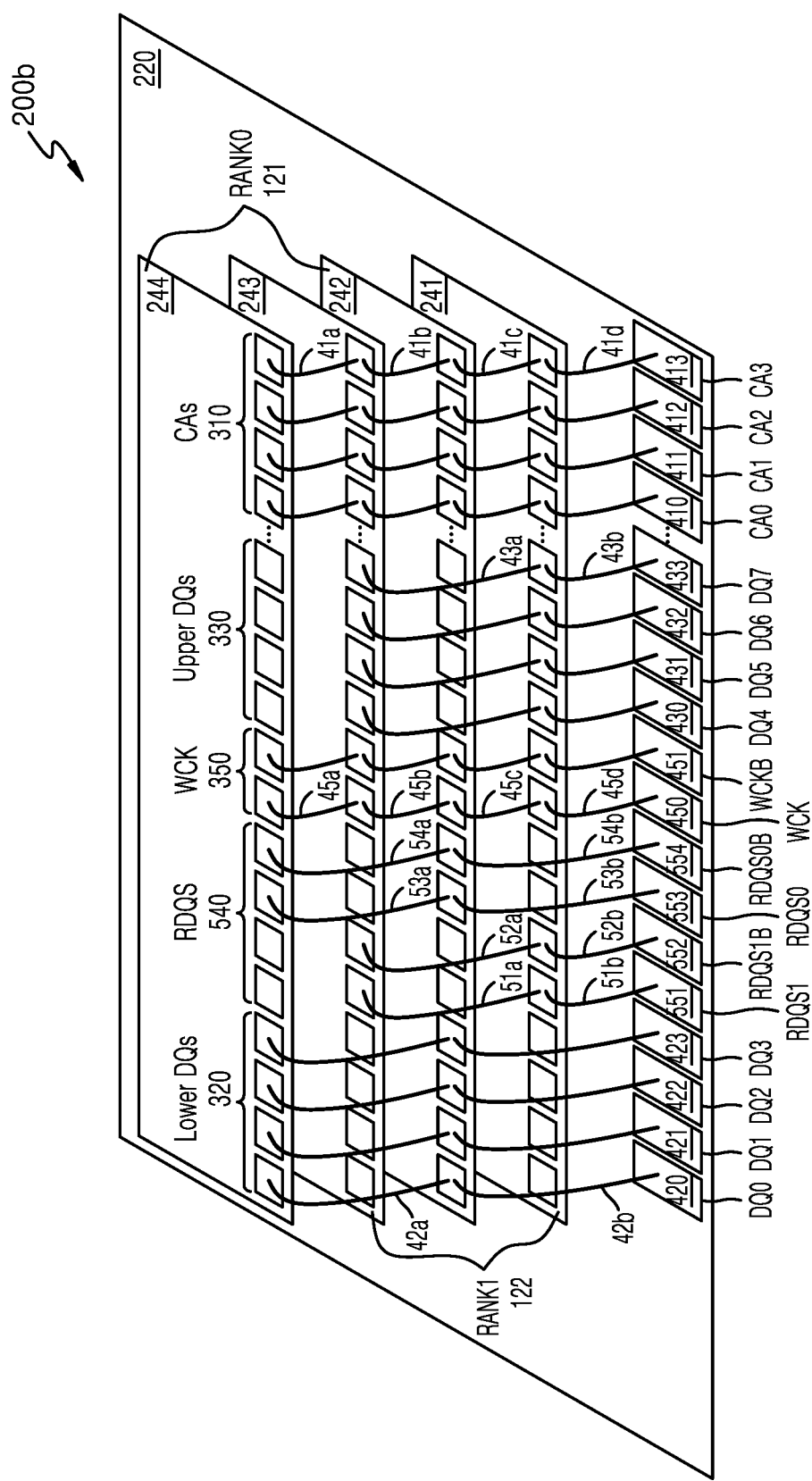
FIG. 7 is a diagram conceptually depicting at least a portion of an example semiconductor package according to one or more embodiments.

FIG. 7 is a diagram conceptually depicting at least a portion of an example semiconductor package according to one or more embodiments.

Referring to FIG. 7, a semiconductor package 200*b* differs from the semiconductor package 200*a* of FIG. 5 in that the data DQ transmitted to/received from the memory controller 112 (FIG. 1) includes a data width of 8 bits. The data width of 8 bits may be divided into a lower byte of 4-bit data (DQ[3:0]) and an upper byte of 4-bit data (DQ[7:4]). It is to be appreciated that embodiments of the inventive concept are not limited to a data width of any specific number of bits.

The package substrate 220 may include the contact pads 420 to 423 that transmit lower byte data (DQ[3:0]) and the contact pads 430 to 433 that transmit upper byte data (DQ[7:4]). The contact pads 420 to 423 may be connected to the wire bonds 42*a* and 42*b* connected to the memory dies 242 and 244 of the first rank 121 and may transmit/receive DQ[3:0] data to/from lower DQ die bond pads 320 of the corresponding memory dies 242 and 244. The contact pads 430 to 433 may be connected to the wire bonds 43*a* and 43*b* connected to the memory dies 241 and 243 of the second rank 122 and may transmit/receive DQ[7:4] data to/from upper DQ die bond pads 330 of the corresponding memory dies 241 and 243.

Figure 8:
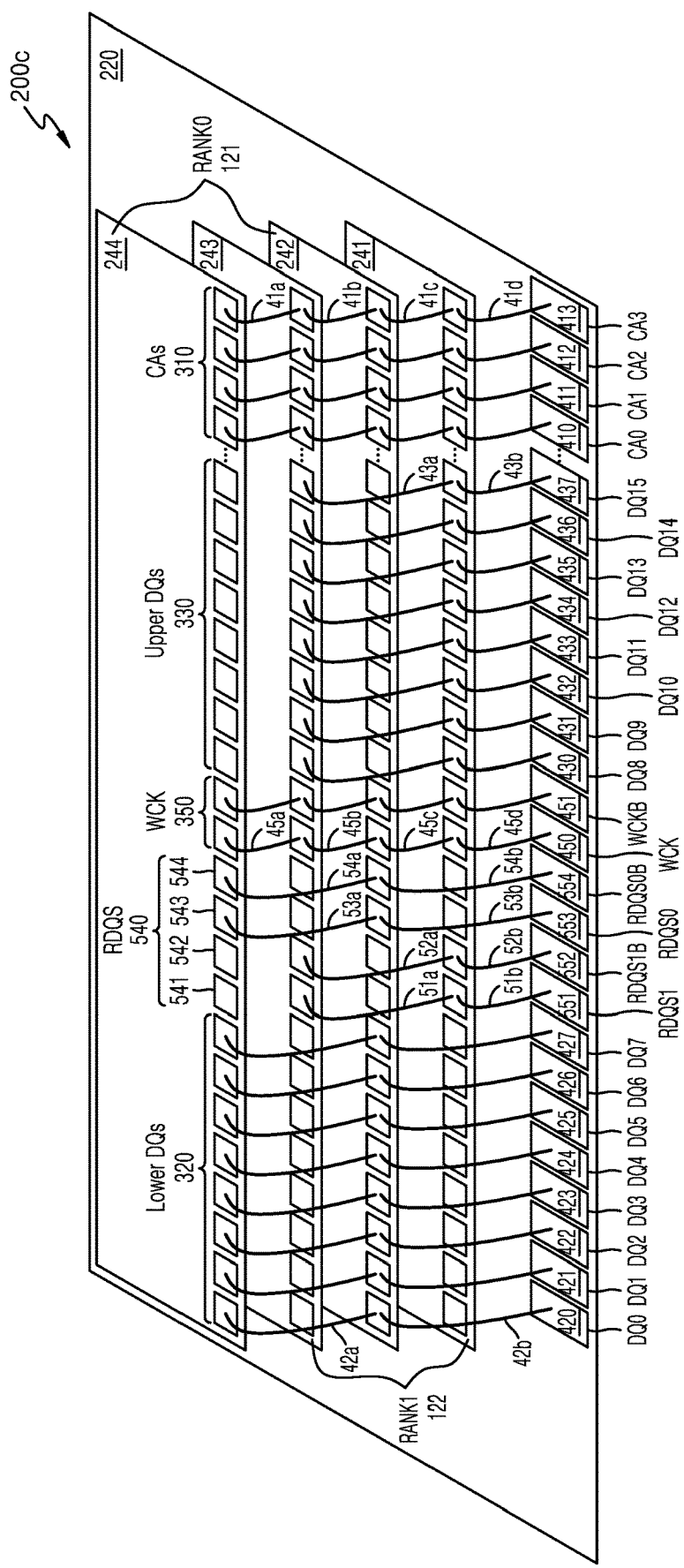
FIG. 8 is a diagram conceptually depicting at least a portion of an example semiconductor package according to one or more embodiments.

FIG. 8 is a diagram conceptually depicting at least a portion of an example semiconductor package according to one or more embodiments.

Referring to FIG. 8, a semiconductor package 200*c* differs from the semiconductor package 200*a* of FIG. 5 in that the data DQ transmitted to/received from the memory controller 112 includes a data width of 16 bits. The data width of 16 bits may be divided into a lower byte of 8-bit data (DQ[7:0]) and an upper byte of 8-bit data (DQ[15:8]).

The package substrate 220 may include contact pads 420 to 427 that transmit lower byte data (DQ[7:0]) and contact pads 430 to 437 that transmit upper byte data (DQ[15:8]). The contact pads 420 to 427 may be connected to the wire bonds 42*a* and 42*b* connected to the memory dies 242 and 244 of the first rank 121 and may transmit/receive DQ[7:0] data to/from the lower DQ die bond pads 320 of the corresponding memory dies 242 and 244. The contact pads 430 to 437 may be connected to the wire bonds 43*a* and 43*b* connected to the memory dies 241 and 243 of the second rank 122 and may transmit/receive DQ[15:8] data to/from the upper DQ die bond pads 330 of the corresponding memory dies 241 and 243.

Figure 9:
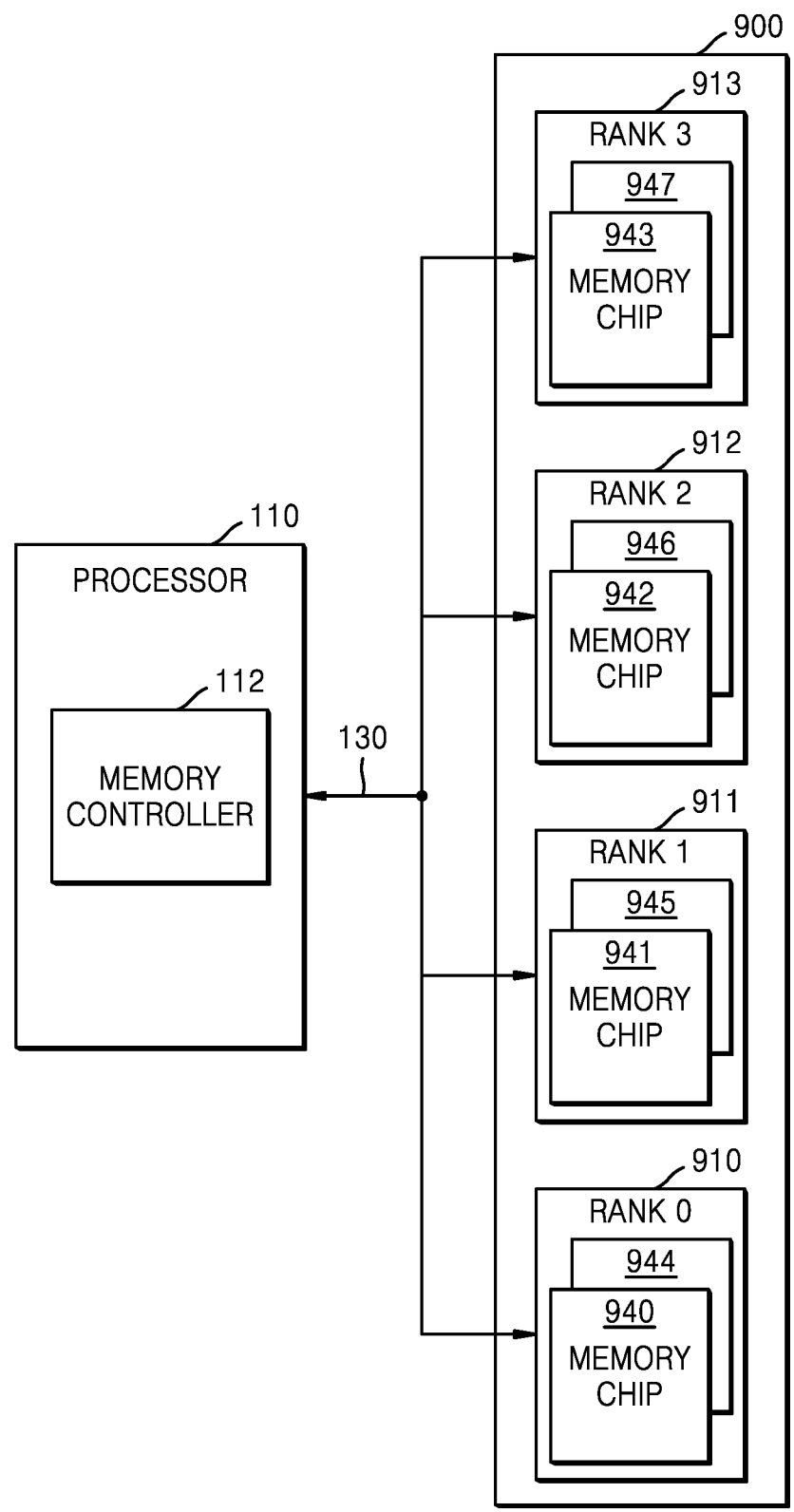
FIG. 9 is a block diagram for explaining an example memory system according to one or more embodiments.

FIG. 9 is a block diagram depicting at least a portion of an example memory system according to one or more embodiments. FIGS. 10A to 10D are diagrams for explaining a configuration of an example memory chip for each rank of the illustrative memory system shown in FIG. 9, according to one or more embodiments.

Referring to FIG. 9, the memory controller 112 of the processor 110 may communicate with a memory system 900 via the channel 130. The memory system 900 may include a plurality of memory chips 940 to 947, and the plurality of memory chips 940 to 947 may be logically and/or physically divided into at least 4 ranks. The memory system 900 may have a 4-rank structure, and may be implemented as an MCP in which the memory chips 940 and 944 constitute a first rank (RANK 0) 910, the memory chips 941 and 945 constitute a second rank (RANK 1) 911, the memory chips 942 and 946 constitute a third rank (RANK 2) 912, and the memory chips 943 and 947 constitute a fourth rank (RANK 3) 913. It is to be appreciated that embodiments of the inventive concept are not limited to any specific arrangement of the memory chips.

Figure 10A:
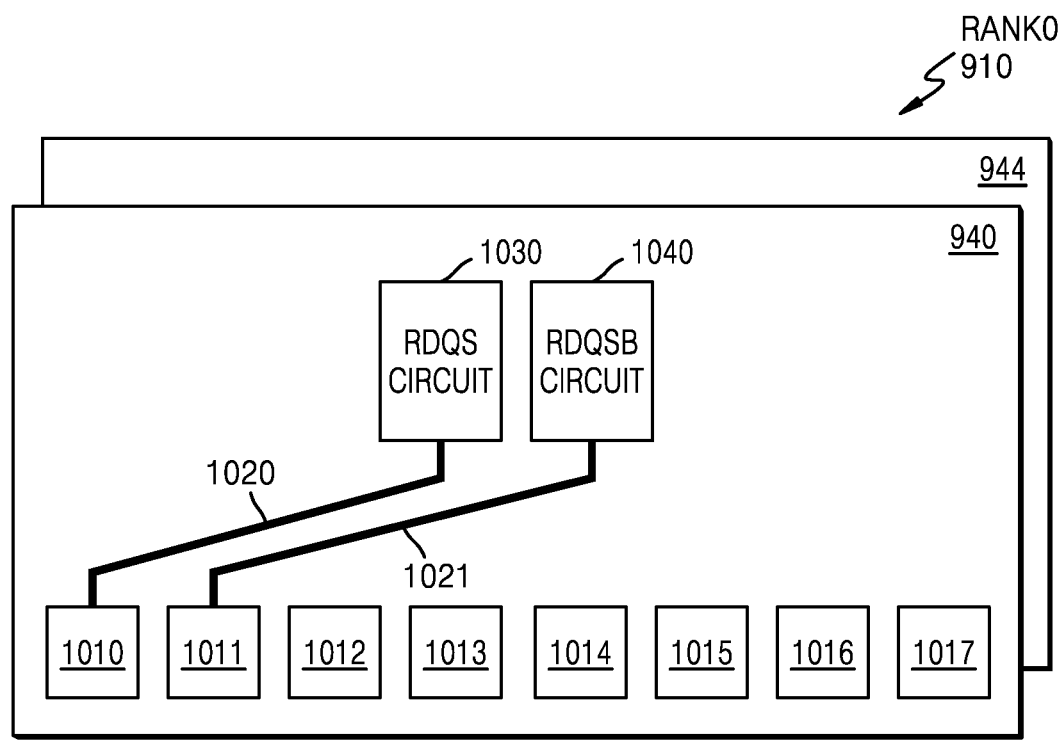
FIGS. 10A to 10D are block diagrams for explaining an example configuration of a memory chip for each rank of the illustrative memory system shown in FIG. 9, according to one or more embodiments.

Referring to FIG. 10A, each of the memory chips 940 and 944 of the first rank 910 may include an RDQS clock circuit 1030 that generates an RDQS clock signal and an RDQSB clock circuit 1040 that generates an RDQSB clock signal, described with reference to FIG. 6A. The RDQS and RDQSB clock signals may provide timing of the read data DQ when the read data DQ is transmitted via a plurality of lower and upper DQ pads (for example, DQ0 to DQ5 and DQ6 to DQ11). In addition, each of the memory chips 940 and 944 may include a plurality of die bond pads 1010 to 1017 connected to the RDQS clock circuit 1030 and the RDQSB clock circuit 1040. For example, the die bond pads 1010 and 1011 may be configured to transmit RDQS0 and RDQS0B clock signals of the first rank 910, the die bond pads 1012 and 1013 may be configured to transmit RDQS1 and RDQS1B clock signals of the second rank 911, the die bond pads 1014 and 1015 may be configured to transmit RDQS2 and RDQS2B clock signals of the third rank 912, and the die bond pads 1016 and 1017 may be configured to transmit RDQS3 and RDQS3B clock signals of the fourth rank 913.

In FIG. 10A, the die bond pads 1010 and 1011 may be connected to the RDQS and RDQSB clock circuits 1030 and 1040 via an uppermost metal wiring or redistribution layers 1020 and 1021, respectively. The RDQS clock signal generated by the RDQS clock circuit 1030 may be provided to the die bond pad 1010, and the RDQSB clock signal generated by the RDQSB clock circuit 1040 may be provided to the die bond pad 1011.

Figure 10B:
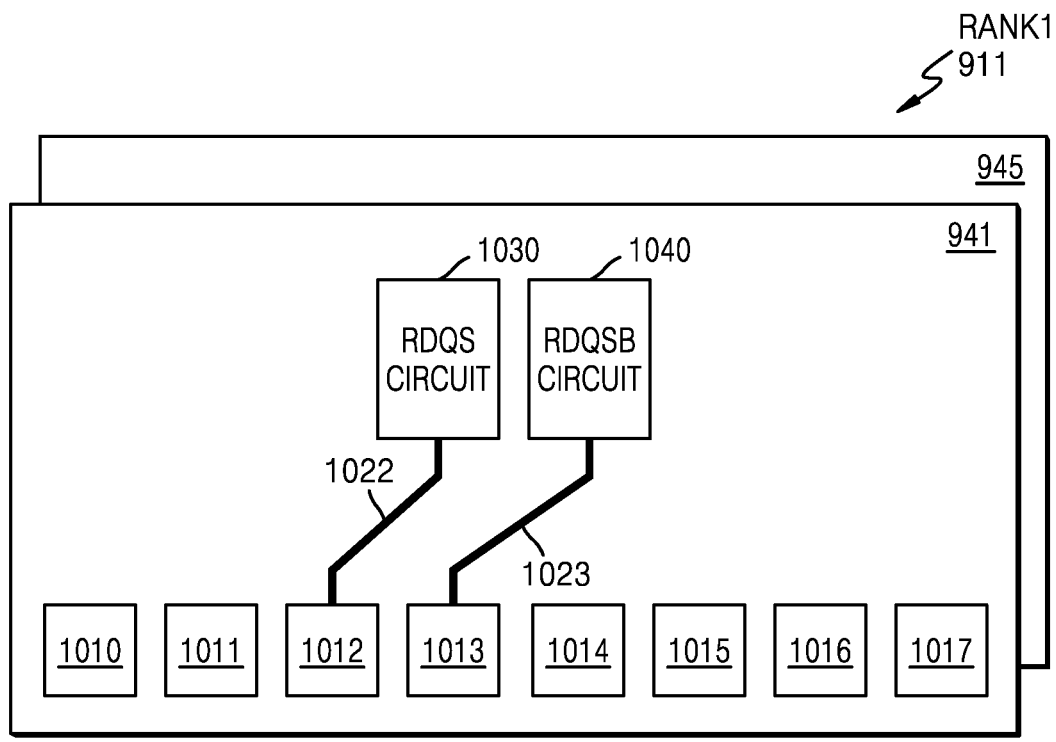

In FIG. 10B, in each of the memory chips 941 and 945 of the second rank 911, the die bond pads 1012 and 1013 may be connected to the RDQS and RDQSB clock circuits 1030 and 1040 via an uppermost metal wiring or redistribution layers 1022 and 1023, respectively. The RDQS clock signal generated by the RDQS clock circuit 1030 may be provided to the die bond pad 1012, and the RDQSB clock signal generated by the RDQSB clock circuit 1040 may be provided to the die bond pad 1013.

Figure 10C:
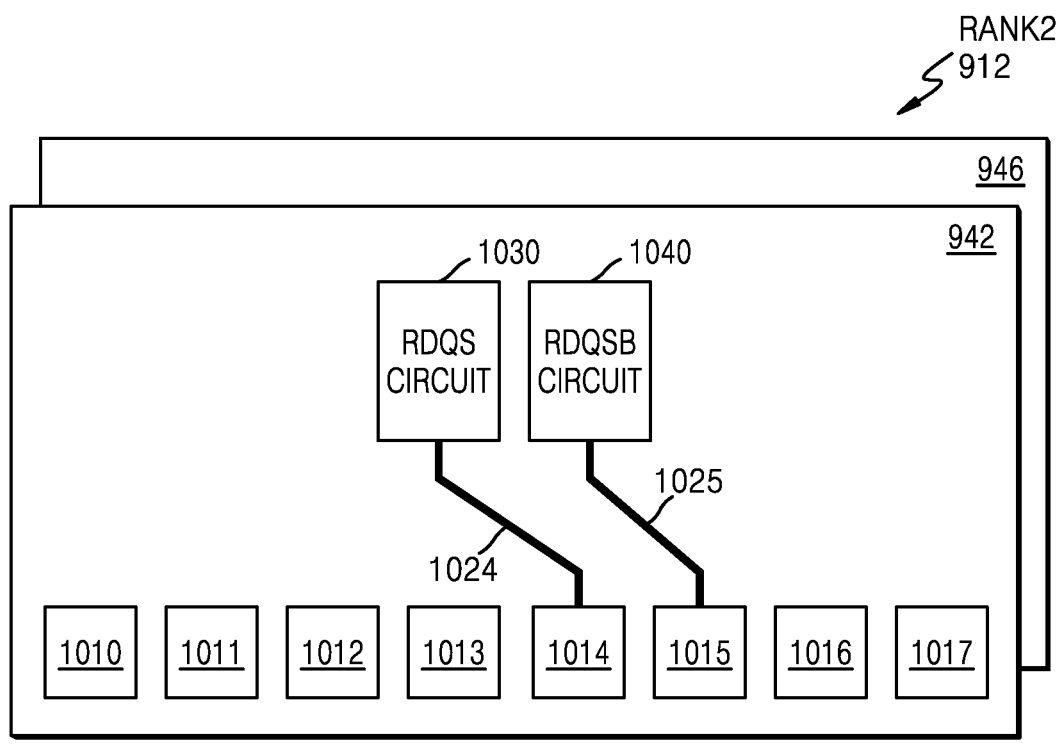

In FIG. 10C, in each of the memory chips 942 and 946 of the third rank 912, the die bond pads 1014 and 1015 may be connected to the RDQS and RDQSB clock circuits 1030 and 1040 via an uppermost metal wiring or redistribution layers 1024 and 1025, respectively. The RDQS clock signal generated by the RDQS clock circuit 1030 may be provided to the die bond pad 1014, and the RDQSB clock signal generated by the RDQSB clock circuit 1040 may be provided to the die bond pad 1015.

Figure 10D:
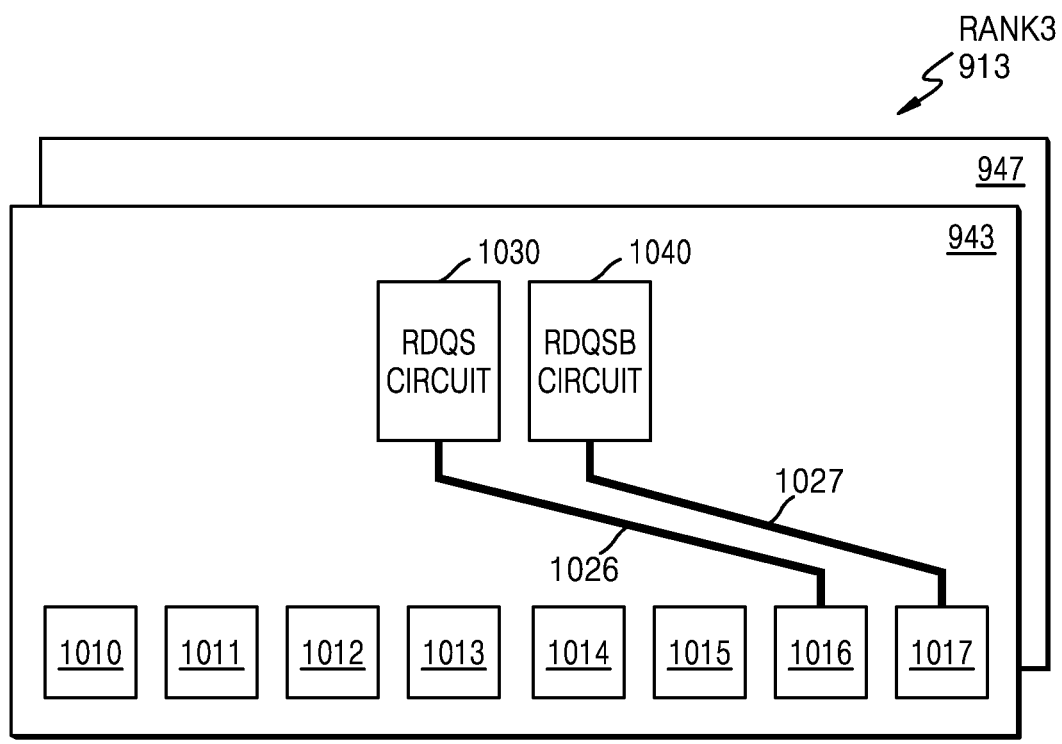

In FIG. 10D, in each of the memory chips 943 and 947 of the fourth rank 913, the die bond pads 1016 and 1017 may be connected to the RDQS and RDQSB clock circuits 1030 and 1040 via an uppermost metal wiring or redistribution layers 1026 and 1027, respectively. The RDQS clock signal generated by the RDQS clock circuit 1030 may be provided to the die bond pad 1016, and the RDQSB clock signal generated by the RDQSB clock circuit 1040 may be provided to the die bond pad 1017.

As each of the memory chips 940 to 947 includes die bond pads that carry the RDQS and RDQSB clock signals for each rank, and connects die bond pads corresponding to a corresponding rank to the RDQS and RDQSB clock circuits 1030 and 1040 via the uppermost metal wiring or the redistribution layers, the configurations of the memory chips 940 to 947 may be facilitated without performing a separate process. In addition, as RDQS and RDQSB die bond pads of the corresponding rank between the memory die stack in which the memory chips 940 to 947 are stacked are electrically connected to each other via wire bonds, signal characteristics and/or performance of the MCP may be improved.

Figure 11:
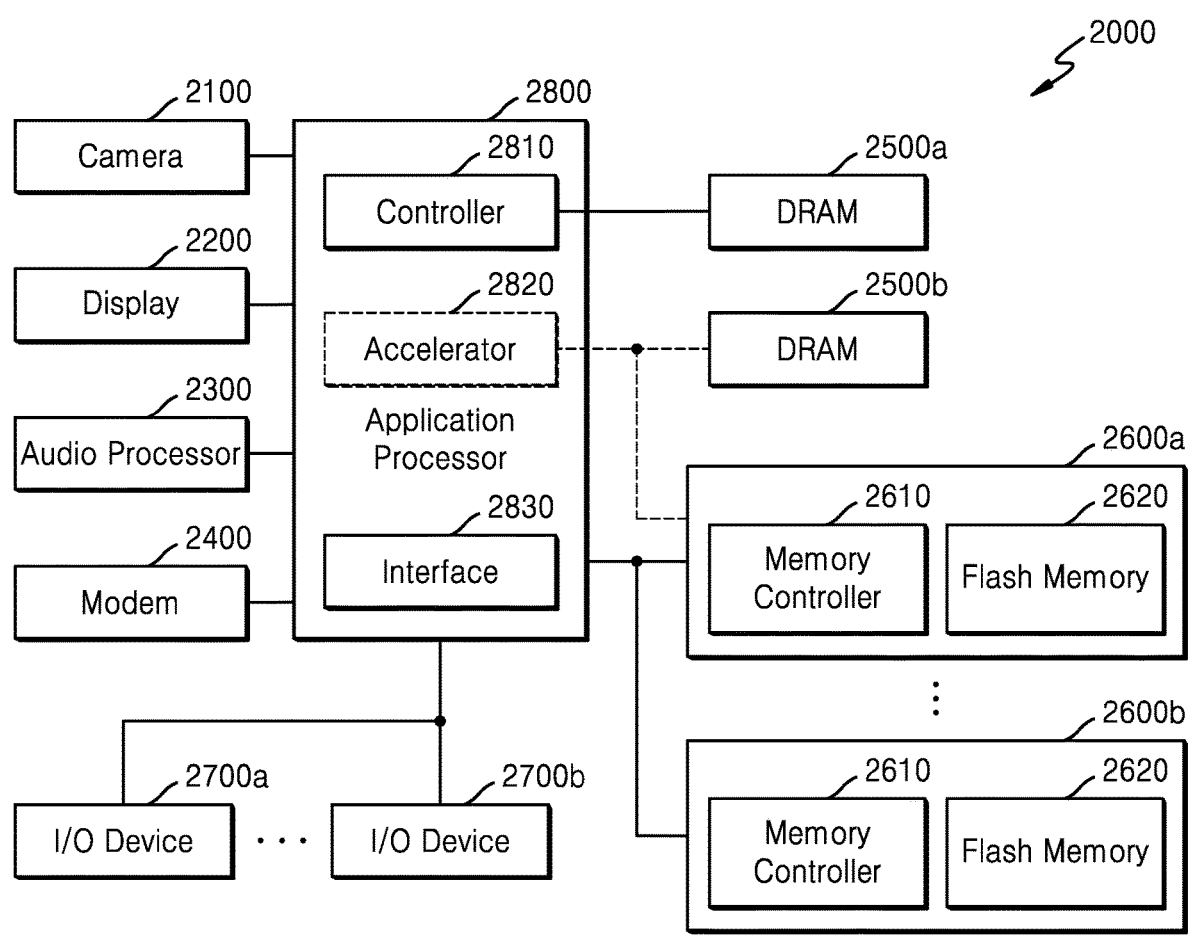
FIG. 11 is a block diagram of at least a portion of an example system for explaining an electronic device including a semiconductor package, according to one or more embodiments.

By way of example only and without limitation, FIG. 11 is a block diagram depicting at least a portion of an example system for explaining an electronic device including a semiconductor package, according to one or more embodiments.

Referring to FIG. 11, a system 2000 may include a camera 2100, a display 2200, an audio processor 2300, a modem 2400, DRAMs 2500a and 2500b, flash memories 2600a and 2600b, I/O devices 2700a and 2700b, and an application processor (AP) 2800. The system 2000 may be implemented, for example, as a laptop computer, a mobile phone, a smartphone, a table PC, a wearable device, a healthcare device, or an IoT device. In addition, the system 2000 may also be implemented as a server or a PC.

The camera 2100 may capture a still image or a moving image under control by a user, and may store the captured image/image data or transmit the captured image/image data to the display 2200. The audio processor 2300 may process audio data included in the flash memories 2600a and 2600b or content of a network. The modem 2400 may modulate and transmit a signal for transmission/reception of wired/wireless data, and a receiver may perform demodulation to restore an original signal. The I/O devices 2700a and 2700b may include devices that provide digital input and/or output functions, such as a universal serial bus (USB) or storage, a digital camera, a secure digital (SD) card, a digital versatile disc (DVD), a network adapter, and a touch screen.

The AP 2800 may control the overall operation of the system 2000. The AP 2800 may include a controller block 2810, an accelerator block or accelerator chip 2820, and an interface block 2830. The AP 2800 may control the display 2200 to display some of the content stored in the flash memories 2600a and 2600b on the display 2200. When receiving a user input via the I/O devices 2700a and 2700b, the AP 2800 may perform a control operation corresponding to the user input. The AP 2800 may include an accelerator block, which is a dedicated circuit for an artificial intelligence (AI) data operation, or may optionally include the accelerator chip 2820 independently from the AP 2800. The DRAM 2500b may be additionally mounted on the accelerator block or accelerator chip 2820. An accelerator is a functional block that specializes in performing a particular function of the AP 2800, and the accelerator may include a GPU which is a functional block that specializes in graphical data processing, a neural processing unit (NPU) which is a block that specializes in AI calculation and inference, and a data processing unit (DPU) that specializes in data transmission.

The system 2000 may include the DRAMs 2500a and 2500b. The AP 2800 may perform communication by setting a DRAM interface protocol to control the DRAMs 2500a and 2500b via commands complying with the Joint Electron Device Engineering Council (JEDEC) standards and mode-register setting (MRS), or to use company-specific functions, such as low voltage/high speed/reliability, and cyclic redundancy check (CRC)/error correction code (ECC) functions. For example, the AP 2800 may communicate with the DRAM 2500a via an interface complying with the JEDEC standards, such as LPDDR4 or LPDDR5, and the accelerator block or accelerator chip 2820 may perform communication by setting a new DRAM interface protocol to control the DRAM 2500b for an accelerator, which has a greater bandwidth than that of the DRAM 2500a.

FIG. 11 illustrates only the DRAMs 2500a and 2500b, but the inventive concept is not limited thereto, and any memory such as PRAM, SRAM, MRAM, RRAM, FRAM, or hybrid RAM may be used as long as a bandwidth, a response speed, voltage conditions of the AP 2800 or the accelerator chip 2820 are satisfied. The DRAMs 2500a and 2500b may have relatively smaller latency and bandwidth than the I/O devices 2700a and 2700b or the flash memories 2600a and 2600b. The DRAMs 2500a and 2500b may be initialized at a time point at which the system 2000 is powered on, and may be loaded with an operating system and application data, and thus, the DRAMs 2500a and 2500b may be used as temporary storage for the operating system and the application data or may be used as execution spaces for various software code.

Addition/subtraction/multiplication/division operations and vector operations, address operations, or fast Fourier transform (FFT) operations may be performed in the DRAMs 2500a and 2500b. In addition, a function for an operation used for inference may be performed in the DRAMs 2500a and 2500b. In this regard, the inference may be performed in a deep learning algorithm using an artificial neural network. The deep learning algorithm may include a training operation for learning a model via various pieces of data and an inference operation for recognizing data with the trained model. In an embodiment, an image captured by a user via the camera 2100 may be signal-processed and stored in the DRAM 2500b, and the accelerator block or accelerator chip 2820 may perform AI data operation for recognizing data by using data stored in the DRAM 2500b and a function used for inference.

The system 2000 may include a plurality of storage elements or the flash memories 2600a and 2600b, having larger capacities than the DRAMs 2500a and 2500b. The accelerator block or accelerator chip 2820 may perform a training operation and AI data operation by using the flash memories 2600a and 2600b. In an embodiment, the flash memories 2600a and 2600b may include a memory controller 2610 and a flash memory device 2620, and may more efficiently perform the training operation and the inference AI data operation, which are performed by the AP 2800 and/or the accelerator chip 2820, by using a computing device included in the memory controller 2610. The flash memories 2600a and 2600b may store pictures taken via the camera 2100 or may store data received via a data network.

For example, augmented reality/virtual reality, high definition (HD), or ultra-high definition (UHD) content may be stored.

In the system 2000, the DRAMs 2500*a* and 2500*b* may include the semiconductor package described with reference to FIGS. 1 to 10. The semiconductor package may include a memory die stack mounted on a package substrate and including a stack of a plurality of memory dies, and the plurality of memory dies may include memory dies of a first rank and memory dies of a second rank. Each of at least a subset of the plurality of memory dies may include a clock circuit that generates a read clock signal for a lower byte and an upper byte constituting a data width, a first die bond pad that transfers a read clock signal of the first rank, and a second die bond pad that transfers a read clock signal of the second rank. The clock circuit is connected to, among the first and second die bond pads, a die bond pad that transfers the read clock signal of a rank to which a corresponding memory die belongs. Accordingly, as the memory die includes the die bond pads that carry the read clock signal for each rank, a read clock circuit shared by the lower and upper bytes of each memory die stack is connected to a die bond pad that carries the read clock signal of a rank to which the memory die belongs, and corresponding ranks between memory die stacks are connected to each other via wire bonds, signal characteristics and/or performance of the semiconductor package may be improved. In addition, as the die bond pads that carry the read clock signal for each rank are connected to the read clock circuit via a redistribution layer, the configuration of the memory die may be facilitated without performing a separate process.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Spatially descriptive terms such as "above," "below," "upper" and "lower" may be used herein to indicate a position of elements, structures or features relative to one another as illustrated in the figures, rather than absolute positioning. Thus, the semiconductor device or die may be otherwise oriented (e.g., rotated 90 degrees or at other orientations), and the spatially relative descriptions used herein may be interpreted accordingly.

It will also be understood that when an element such as a layer, region or substrate is referred to as being "atop," "above," "on" or "over" another element, it is broadly intended that the element be in direct contact with the other element or intervening elements can also be present. In contrast, when an element is referred to as being "directly on" or "directly over" another element, it is intended that there are no intervening elements present. Likewise, it should be appreciated that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

While the inventive concept has been particularly shown and described with reference to example embodiments thereof, it will be understood that various changes in form and details may be made therein without departing from the spirit and scope of the following claims.

What is claimed is:

1. A memory device, comprising:
   a first clock circuit configured to generate a read clock signal for a lower byte and an upper byte constituting a data width of a first memory die; and
   a plurality of first die bond pads corresponding to respective ranks of a memory system including the first memory die, wherein each of the plurality of first die bond pads is configured to be connected to a corresponding die bond pad of a second memory die in a corresponding rank, among the respective ranks of the memory system, to which the second memory die belongs,
   wherein the first clock circuit is connected to a die bond pad among the plurality of first die bond pads of the first memory die, and
   wherein the first memory die corresponds to a first rank among the respective ranks in a memory die stack including a plurality of memory dies, the second memory die corresponds to a second rank among the respective ranks, and each of the plurality of memory dies of the first rank and each of the plurality of memory dies of the second rank are alternately stacked and stacked in a continuous offset stepped configuration.

2. The memory device of claim 1, wherein the first clock circuit and the die bond pad among the plurality of first die bond pads of the first memory die are connected together by an uppermost metal layer of the first memory die.

3. The memory device of claim 1, wherein the first clock circuit and the die bond pad among the plurality of first die bond pads of the first memory die are connected together by a redistribution layer of the first memory die.

4. The memory device of claim 1, further comprising:
   a second clock circuit configured to receive a data clock signal for the lower byte and the upper byte, wherein the data clock signal is configured for use during a read operation and a write operation of the first memory die; and
   a second die bond pad connected to the second clock circuit.

5. The memory device of claim 1, wherein the data width comprises 12 bits, and each of the lower and upper bytes comprises 6 bits.

6. The memory device of claim 1, wherein the data width comprises 8 bits, and each of the lower and upper bytes comprises 4 bits.

7. The memory device of claim 1, wherein the data width comprises 16 bits, and each of the lower and upper bytes comprises 8 bits.

8. A semiconductor package, comprising:
   a package substrate;
   a memory die stack on the package substrate and comprising a stack of a plurality of memory dies, wherein the plurality of memory dies comprises memory dies of a first rank and memory dies of a second rank, each of the memory dies of the first rank are alternately stacked with the memory dies of the second rank and are stacked in a continuous offset stepped configuration;
   first wire bonds connecting the memory dies of the first rank; and
   second wire bonds connecting the memory dies of the second rank, wherein each of the plurality of memory dies comprises:
a clock circuit configured to generate a read clock signal for a lower byte and an upper byte constituting a data width of a corresponding one of the memory dies;
a first die bond pad configured to transfer a read clock signal of the first rank; and
a second die bond pad configured to transfer a read clock signal of the second rank,
wherein the clock circuit is connected to, among the first and second die bond pads, a die bond pad configured to transfer the read clock signal of a rank among the first and second ranks to which a corresponding one of the plurality of memory dies belongs.

9. The semiconductor package of claim 8, wherein in each of the plurality of memory dies, the clock circuit and the die bond pad are connected together by an uppermost metal layer of the corresponding one of the plurality of memory dies.

10. The semiconductor package of claim 8, wherein in each of the plurality of memory dies, the clock circuit and the die bond pad are connected by a redistribution layer of the corresponding one of the plurality of memory dies.

11. The semiconductor package of claim 8, wherein each of the plurality of memory dies further comprises:
a second clock circuit configured to receive a data clock signal for the lower byte and the upper byte, wherein the data clock signal is configured for use during a read operation and a write operation of each of the plurality of memory dies; and
a second die bond pad connected to the second clock circuit.

12. The semiconductor package of claim 8, wherein the package substrate comprises:
first contact pads connected to the first wire bonds, wherein at least a subset of the first contact pads receive the read clock signal of the first rank; and
second contact pads connected to the second wire bonds, wherein at least a subset of the second contact pads receive the read clock signal of the second rank.

13. The semiconductor package of claim 8, wherein the data width comprises 12 bits, and each of the lower and upper bytes comprises 6 bits.

14. The semiconductor package of claim 8, wherein the data width comprises 8 bits, and each of the lower and upper bytes comprises 4 bits.

15. The semiconductor package of claim 8, wherein the data width comprises 16 bits, and each of the lower and upper bytes comprises 8 bits.

16. A semiconductor package, comprising:
a package substrate; and
a memory die stack on the package substrate and comprising a stack of a plurality of memory dies, wherein the plurality of memory dies is arranged among a plurality of ranks, each of a first subset of the plurality of memory dies of a first rank and each of a second subset of the plurality of memory dies of a second rank being alternately stacked and are stacked in a continuous offset stepped configuration,
wherein each of the plurality of memory dies comprises:
a clock circuit configured to generate a read clock signal for a lower byte and an upper byte, the lower byte and the upper byte, together, constituting a data width of a corresponding one of the memory dies; and
a plurality of first die bond pads corresponding to a number of the plurality of ranks, each of the plurality of first die bond pads is configured to be connected to a corresponding die bond pad of at least a second memory die in a corresponding rank among the plurality of ranks to which a corresponding one of the memory dies belongs,
wherein the clock circuit is connected to a die bond pad among the plurality of first die bond pads.

17. The semiconductor package of claim 16, wherein in each of the plurality of memory dies, the clock circuit and the die bond pad among the plurality of first die bond pads are connected together by an uppermost metal layer of each memory die of the plurality of memory dies.

18. The semiconductor package of claim 16, wherein in each of the plurality of memory dies, the clock circuit and the die bond pad among the plurality of first die bond pads of each memory die of the plurality of memory dies are connected together by a redistribution layer of the memory die.

19. The semiconductor package of claim 16, wherein the data width comprises 12 bits, and each of the lower and upper bytes comprises 6 bits.

* * * * *